US008467946B2

(12) United States Patent
Takahashi et al.

(10) Patent No.: US 8,467,946 B2
(45) Date of Patent: Jun. 18, 2013

(54) SHIFT CONTROL OF CONTINUOUSLY VARIABLE TRANSMISSION

(75) Inventors: Seiichiro Takahashi, Isehara (JP); Hiroyasu Tanaka, Atsugi (JP); Ryousuke Nonomura, Kawasaki (JP); Jouji Seki, Zama (JP); Takuichiro Inoue, Fujisawa (JP); Mamiko Inoue, Ebina (JP); Hideaki Suzuki, Yokohama (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 343 days.

(21) Appl. No.: 12/836,104

(22) Filed: Jul. 14, 2010

(65) Prior Publication Data
US 2011/0015836 A1 Jan. 20, 2011

(30) Foreign Application Priority Data

Jul. 17, 2009 (JP) ................................ 2009-169163

(51) Int. Cl.
*F16H 61/40* (2010.01)

(52) U.S. Cl.
USPC ................ 701/55; 701/51; 477/107; 477/68; 477/73; 477/90; 477/115; 475/208

(58) Field of Classification Search
USPC .................. 701/55, 51, 54, 58; 477/107, 68, 477/73, 90, 115; 475/208
See application file for complete search history.

(56) References Cited

U.S. PATENT DOCUMENTS

| 4,672,863 | A | | 6/1987 | Itoh et al. |
| 4,674,359 | A | | 6/1987 | Hattori |
| 4,793,217 | A | | 12/1988 | Morisawa et al. |
| 5,207,122 | A | | 5/1993 | Minagawa |
| 5,282,401 | A | | 2/1994 | Hebbale et al. |
| 5,427,579 | A | | 6/1995 | Kanehara et al. |
| 5,456,647 | A | | 10/1995 | Holbrook |
| 5,468,198 | A | | 11/1995 | Holbrook et al. |
| 5,707,313 | A | * | 1/1998 | Suzuki ............................ 477/43 |
| 5,711,741 | A | * | 1/1998 | Inoue .............................. 476/10 |
| 5,827,153 | A | | 10/1998 | Yasue et al. |
| 5,947,856 | A | | 9/1999 | Tabata et al. |
| 5,984,829 | A | * | 11/1999 | Minagawa et al. ............. 477/98 |

(Continued)

FOREIGN PATENT DOCUMENTS

| DE | 34 24 646 A1 | 2/1985 |
| DE | 100 51 692 A1 | 5/2001 |

(Continued)

OTHER PUBLICATIONS

U.S. Appl. No. 12/836,021, filed Jul. 14, 2010, Nonomura et al.

(Continued)

*Primary Examiner* — Tuan C. To
(74) *Attorney, Agent, or Firm* — Foley & Lardner LLP

(57) ABSTRACT

A speed ratio of a continuously variable transmission mechanism 20 is increased when a speed ratio of a subtransmission mechanism 30 connected in series to the continuously variable transmission mechanism 20 is switched from a first speed to a second speed. When an excess rotation speed Nb obtained by subtracting a target rotation speed from an engine rotation speed Ne exceeds a determination value Nr1 during this shifting process, a rapid rotation increase in an internal combustion engine 1 is prevented by reducing a shift speed of the continuously variable transmission mechanism 20 (S105A).

12 Claims, 14 Drawing Sheets

U.S. PATENT DOCUMENTS

| | | | |
|---|---|---|---|
| 6,157,884 A | 12/2000 | Narita et al. | |
| 6,295,497 B1 | 9/2001 | Kuras | |
| 6,344,008 B1 | 2/2002 | Nagano et al. | |
| 6,514,165 B2* | 2/2003 | Saito | 475/118 |
| 6,543,593 B2* | 4/2003 | Saito | 192/48.4 |
| 6,876,913 B2* | 4/2005 | Segawa et al. | 701/67 |
| 7,108,631 B2 | 9/2006 | Inoue et al. | |
| 7,637,836 B2 | 12/2009 | Watanabe et al. | |
| 7,780,570 B2* | 8/2010 | Iwatsuki et al. | 477/78 |
| 8,052,572 B2 | 11/2011 | Unno | |
| 8,131,436 B2* | 3/2012 | Suzuki et al. | 701/51 |
| 8,187,145 B2* | 5/2012 | Kaminsky et al. | 477/5 |
| 8,204,659 B2* | 6/2012 | Kouno et al. | 701/55 |
| 8,214,093 B2* | 7/2012 | Heap et al. | 701/22 |
| 8,216,110 B2* | 7/2012 | Katakura et al. | 477/79 |
| 2002/0034999 A1* | 3/2002 | Saito | 475/120 |
| 2002/0035011 A1* | 3/2002 | Saito | 477/68 |
| 2005/0090365 A1* | 4/2005 | Tamai et al. | 477/5 |
| 2005/0164820 A1* | 7/2005 | Miyata et al. | 475/215 |
| 2006/0089775 A1 | 4/2006 | Whitton et al. | |
| 2007/0129922 A1 | 6/2007 | Lee et al. | |
| 2008/0020896 A1 | 1/2008 | Kamishima | |
| 2008/0032861 A1 | 2/2008 | Maki et al. | |
| 2008/0096721 A1 | 4/2008 | Honma et al. | |
| 2009/0105041 A1 | 4/2009 | McKenzie et al. | |
| 2009/0111650 A1 | 4/2009 | Jeon | |
| 2010/0057316 A1 | 3/2010 | Tanaka et al. | |
| 2010/0228412 A1 | 9/2010 | Sah | |
| 2011/0231048 A1* | 9/2011 | Matsubara et al. | 701/22 |

FOREIGN PATENT DOCUMENTS

| | | |
|---|---|---|
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 A | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 63-266264 A | 11/1988 |
| JP | 63-266265 A | 11/1988 |
| JP | 4-211760 A | 8/1992 |
| JP | 5-10427 A | 1/1993 |
| JP | 05-026317 A | 2/1993 |
| JP | 5-71627 A | 3/1993 |
| JP | 5-79554 A | 3/1993 |
| JP | 6-331013 A | 11/1994 |
| JP | 06-331016 A | 11/1994 |
| JP | 8-178043 A | 7/1996 |
| JP | 9-210165 A | 8/1997 |
| JP | 10-299880 A | 11/1998 |
| JP | 11-51162 A | 2/1999 |
| JP | 11-082721 A | 3/1999 |
| JP | 11-093987 A | 4/1999 |
| JP | 11-182663 A | 7/1999 |
| JP | 11-210874 A | 8/1999 |
| JP | 2000-145939 A | 5/2000 |
| JP | 2000-266173 A | 9/2000 |
| JP | 2000-346169 A | 12/2000 |
| JP | 2002-89701 A | 3/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2007-92665 A | 4/2007 |
| JP | 2007-118727 A | 5/2007 |
| JP | 2007-146906 A | 6/2007 |
| JP | 2008-059052 A | 3/2008 |
| WO | WO 2009/075283 A1 | 6/2009 |

OTHER PUBLICATIONS

U.S. Appl. No. 12/836,099, filed Jul. 14, 2010, Takahashi et al.
U.S. Appl. No. 12/836,128, filed Jul. 14, 2010, Takahashi et al.
U.S. Appl. No. 12/837,129, filed Jul. 15, 2010, Takahashi et al.
U.S. Appl. No. 12/837,133, filed Jul. 15, 2010, Takahashi et al.
U.S. Appl. No. 12/836,172, filed Jul. 14, 2010, Takahashi et al.
U.S. Appl. No. 12/828,604, filed Jul. 1, 2010, Nonomura et al.
R. Nonomura et al., US PTO Notice of Allowance, U.S. Appl. No. 12/828,604, dated Jun. 7, 2012, (12 pgs.).
R. Nonomura et al., US PTO Notice of Allowance, U.S. Appl. No. 12/828,604, dated Feb. 13, 2012, (17 pgs.).
S. Takahashi et al., US PTO Notice of Allowance on U.S. Appl. No. 12/836,172 Dtd Oct. 19, 2012, (20 pgs.).
S. Takahashi et al., US PTO Notice of Allowance on U.S. Appl. No. 12/836,021 Dtd Oct. 5, 2012, (45 pgs.).
S. Takahashi et al., US PTO Office Action on U.S. Appl. No. 12/836,099 Dtd Sep. 18, 2012, (23 pgs.).
S. Takahashi et al., US PTO Notice of Allowance on U.S. Appl. No. 12/836,128 Dtd Sep. 17, 2012, (50 pgs.).
S. Takahashi et al., US PTO Notice of Allowance on U.S. Appl. No. 12/837,129 Dtd Oct. 11, 2012, (20 pgs.).
S. Takahashi et al., US PTO Non-Final Office Action, U.S. Appl. No. 12/836,099, DTD Mar. 13, 2013, (20 pgs).
S. Takahashi et al., Non-Final Office Action, U.S. Appl. No. 12/837,133 dated Apr. 3, 2013 with references, (71 pages).

* cited by examiner

- 23a, 23b HYDRAULIC CYLINDER
- 31 RAVIGNEAUX PLANETARY GEAR MECHANISM
- 32 LOW BRAKE
- 33 HIGH CLUTCH
- 34 REV BRAKE
- 41 THROTTLE OPENING SENSOR
- 42 ROTATION SPEED SENSOR
- 43 VEHICLE SPEED SENSOR
- 44 OIL TEMPERATURE SENSOR
- 45 INHIBITOR SWITCH

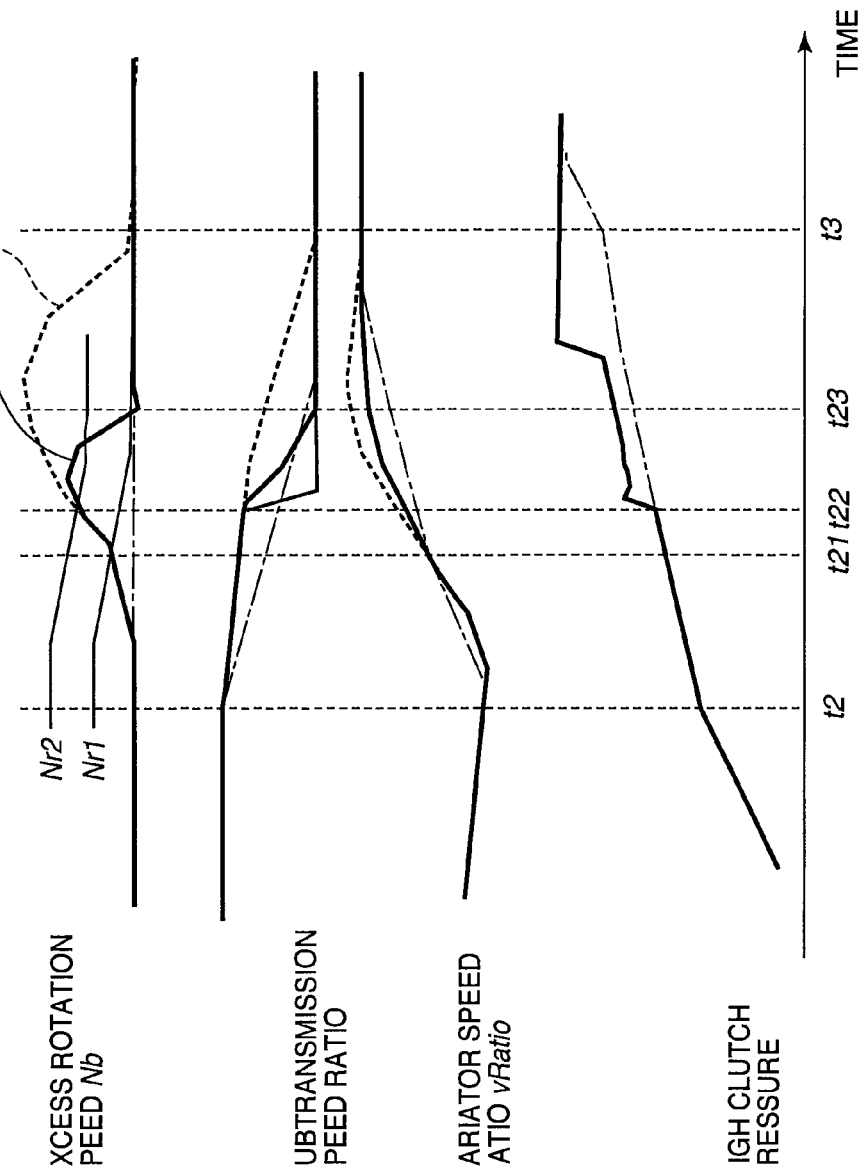

SHIFT CONTROL OF CONTINUOUSLY VARIABLE TRANSMISSION

FIELD OF THE INVENTION

This invention relates to shift control of a continuously variable transmission including a continuously variable transmission mechanism and a subtransmission mechanism.

BACKGROUND OF THE INVENTION

A continuously variable transmission is a transmission having a continuously variable speed ratio.

In a vehicle installed with a continuously variable transmission, an internal combustion engine can be operated more efficiently than in a vehicle having a conventional stepped transmission, and therefore improvements in a power performance and a fuel performance of the vehicle can be expected.

To improve the power performance and fuel performance of a vehicle installed with a continuously variable transmission even further, a possible speed ratio range (to be referred to hereafter as a "ratio range") of the continuously variable transmission is preferably enlarged.

When the ratio range of the continuously variable transmission is enlarged, a speed ratio further toward a Low side is used during startup and acceleration, enabling an improvement in the power performance of the vehicle, and a speed ratio further toward a High side is used during high-speed travel, enabling an improvement in the fuel efficiency performance of the vehicle.

To enlarge the ratio range of a belt continuously variable transmission, a diameter of pulleys around which the belt is wound may be increased. However, an increase in pulley diameter inevitably leads to an increase in the size of the continuously variable transmission.

JPH05-079554A, published by the Japan Patent Office in 2005, proposes that a subtransmission mechanism having two forward speeds be provided in series with the continuously variable transmission either between the internal combustion engine and the continuously variable transmission or between the continuously variable transmission and a final gear. According to this prior art, by modifying a gear position of the subtransmission mechanism in accordance with operating conditions of the vehicle, the ratio range can be enlarged without increasing the size of the continuously variable transmission.

SUMMARY OF THE INVENTION

In this continuously variable transmission, a speed ratio of a continuously variable transmission mechanism (to be referred to hereafter as a variator) is shifted at a predetermined shift speed in accordance with the start of an upshift in the subtransmission mechanism, thereby preventing torque shock accompanying the upshift in the subtransmission mechanism. This type of shift control is known as a coordinated shift.

When a deviation occurs between the shift speed of the subtransmission mechanism and the shift speed of the variator during a coordinated shift, variation occurs in an overall speed ratio of the entire transmission, including the variator and the subtransmission mechanism. As a result of this variation in the overall speed ratio, a rotation speed of the internal combustion engine may increase, causing a rapid rotation increase in the internal combustion engine.

If this type of deviation occurs during high-speed rotation of the internal combustion engine, for example when a throttle is fully open, the rapid rotation increase in the internal combustion engine may lead to over-speeding in the internal combustion engine.

It is therefore an object of this invention to prevent over-speeding in an internal combustion engine by improving a coordinated shift in a continuously variable transmission formed by connecting a subtransmission mechanism and a variator in series.

In order to achieve the above object, this invention provides a control device for a continuously variable transmission that is connected to an internal combustion engine installed in a vehicle. The continuously variable transmission comprises a continuously variable transmission mechanism that modifies a speed ratio continuously and a subtransmission mechanism that is connected in series with the continuously variable transmission mechanism and includes, as vehicle forward advancing gear positions, a first gear position and a second gear position having a smaller speed ratio than the first gear position.

The control device comprises a rotation speed sensor that detects an engine rotation speed of the internal combustion engine, and a shift controller programmed to control the speed ratio of the continuously variable transmission mechanism in an opposite direction to a speed ratio variation of the subtransmission mechanism during a shifting process for shifting the subtransmission mechanism from the first gear position to the second gear position so that a through speed ratio, which is an overall speed ratio of the continuously variable transmission, does not vary, determine, during the shifting process, whether or not an excess rotation speed obtained by subtracting a target rotation speed from the engine rotation speed exceeds a determination value, and reduce a shift speed of the continuously variable transmission mechanism during the shifting process when the excess rotation speed exceeds the determination value.

This invention also provides a control method for the continuously variable transmission. The control method comprises detecting an engine rotation speed of the internal combustion engine, controlling the speed ratio of the continuously variable transmission mechanism in an opposite direction to a speed ratio variation of the subtransmission mechanism during a shifting process for shifting the subtransmission mechanism from the first gear position to the second gear position so that a through speed ratio, which is an overall speed ratio of the continuously variable transmission, does not vary, determining, during the shifting process, whether or not an excess rotation speed obtained by subtracting a target rotation speed from the engine rotation speed exceeds a determination value, and reducing a shift speed of the continuously variable transmission mechanism during the shifting process when the excess rotation speed exceeds the determination value.

The details as well as other features and advantages of this invention are set forth in the remainder of the specification and are shown in the accompanying drawings.

BRIEF DESCRIPTION OF THE DRAWINGS

FIGS. 14A-14D are timing charts illustrating an outline of shift control executed by a shift controller according to a third embodiment of this invention in relation to a rapid rotation increase in the internal combustion engine.

DESCRIPTION OF THE PREFERRED EMBODIMENTS

In the following description, a "speed ratio" of a certain transmission mechanism is a value obtained by dividing an input rotation speed of a transmission mechanism by an output rotation speed of the transmission mechanism.

A "Lowest speed ratio" denotes a maximum speed ratio of the transmission mechanism, and a "Highest speed ratio" denotes a minimum speed ratio of the transmission mechanism.

Figure 1:
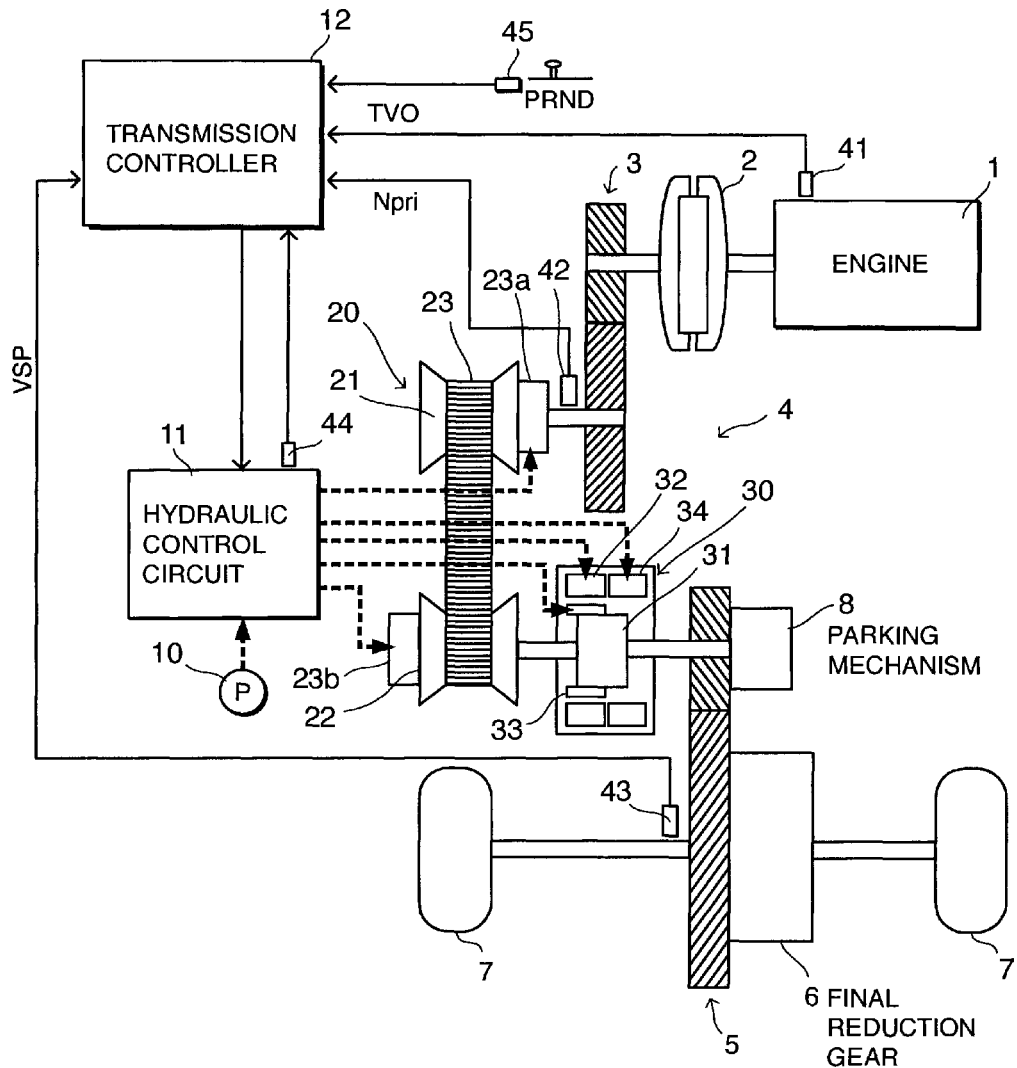
FIG. 1 is a schematic diagram showing the constitution of a vehicle drive system employing a continuously variable transmission according to this invention.

Referring to FIG. 1 of the drawings, a vehicle driving system including a continuously variable transmission 4 according to this invention comprises an internal combustion engine 1 as a power source. Output rotation of the internal combustion engine 1 is transmitted to drive wheels 7 via a torque converter having a lockup clutch 2, a first gear train 3, the continuously variable transmission 4, a second gear train 5, and a final reduction gear 6. The second gear train 5 is provided with a parking mechanism 8 which locks an output shaft of the continuously variable transmission 4 mechanically so that the output shaft is incapable of rotation during parking.

The continuously variable transmission 4 comprises a belt type continuously variable transmission mechanism (to be referred to as a "variator 20" hereafter), and a subtransmission mechanism 30 provided between the variator 20 and the second gear train 5a.

The subtransmission mechanism 30 may be directly connected to an output shaft of the variator 20, as in this example, or via another transmission mechanism or power transmission mechanism, for example, a gear train.

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23a, 23b that is provided on a back surface of the movable conical plate and displaces the movable conical plate in an axial direction. When an oil pressure supplied to the hydraulic cylinder 23a, 23b is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism.

The subtransmission mechanism 30 includes a Ravigneaux planetary gear mechanism 31 coupling the carriers of two planetary gear sets, and a plurality of frictional engagement elements, namely a Low brake 32, a High clutch 33, and a Reverse (Rev) brake 34, connected to a plurality of rotary elements constituting the Ravigneaux planetary gear mechanism 31 to modify the rotation states thereof.

The gear position of the subtransmission mechanism 30 is changed by adjusting the oil pressure supplied to the respective frictional engagement elements 32 to 34 such that the engagement/disengagement states of the respective frictional engagement elements 32 to 34 are modified.

For example, by engaging the Low brake 32 and disengaging the High clutch 33 and Rev brake 34, the gear position of the subtransmission mechanism 30 is set in a first speed.

By engaging the High clutch 33 and disengaging the Low brake 32 and Rev brake 34, the gear position of the subtransmission mechanism 30 is set in a second speed having a smaller speed ratio than the first speed.

By engaging the Rev brake 34 and disengaging the Low brake 32 and the High clutch 33, the gear position of the subtransmission mechanism 30 is set in reverse.

It should be noted that in the following description, a state in which the gear position of the subtransmission mechanism 30 is in the first speed will be expressed as "the continuously variable transmission 4 is in a low speed mode", and a state in which the gear position of the subtransmission mechanism 30 is in the second speed will be expressed as "the continuously variable transmission 4 is in a high speed mode".

In this embodiment, the variator 20 is constituted by a belt-type continuously variable transmission mechanism, but the variator 20 is not limited thereto. A chain-type continuously variable transmission mechanism in which a chain is sandwiched by pulleys, a toroidal continuously variable transmission mechanism including a full toroidal type and a half toroidal type, or any other type of continuously variable transmission mechanism may constitute the variator 20.

The continuously variable transmission 4 further comprises an oil pump 10 which is driven using a part of the power of the internal combustion engine 1, a hydraulic control circuit 11 which regulates an oil pressure from the oil pump 10 and supplies a regulated oil pressure to various sites of the continuously variable transmission 4, and a transmission controller 12 which controls the hydraulic control circuit 11.

Figure 2:
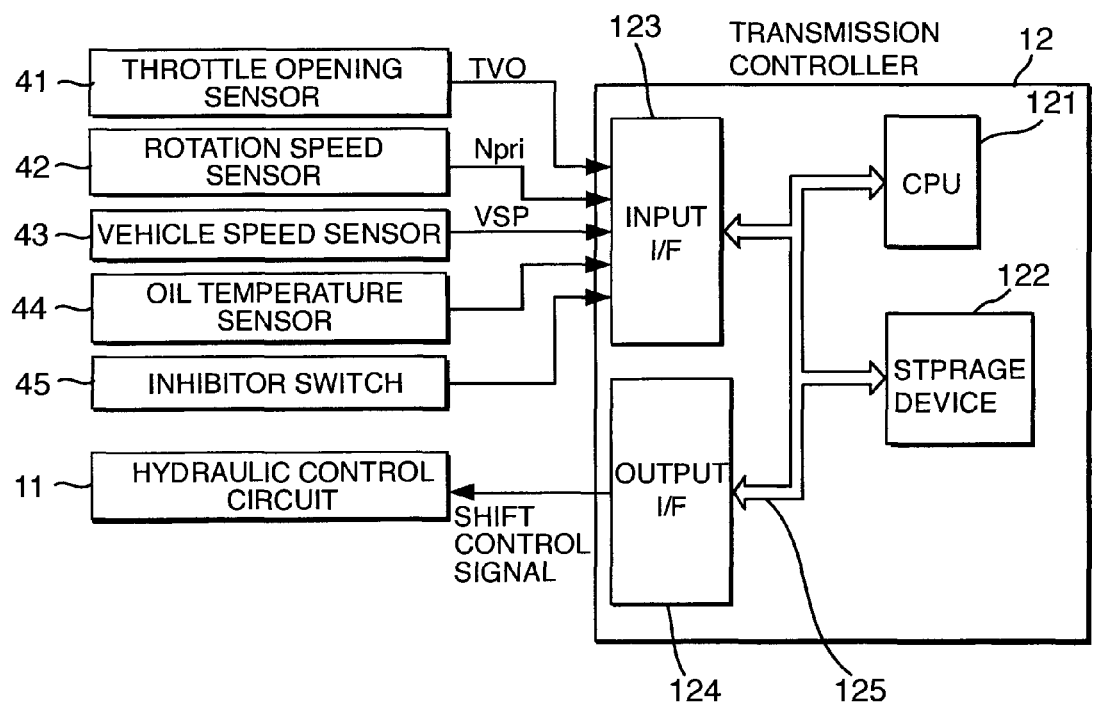
FIG. 2 is a block diagram showing the constitution of a shift controller according to this invention.

Referring to FIG. 2, the transmission controller 12 is constituted by a CPU 121, a storage device 122 including a RAM and a ROM, an input interface 123, an output interface 124, and a bus 125 connecting these components to each other.

An output signal from a throttle opening sensor 41 that detects an opening of a throttle valve of the internal combustion engine 1 (to be referred to as a "throttle opening TVO" hereafter), an output signal from a rotation speed sensor 42 that detects an input rotation speed of the continuously variable transmission 4, which is equal to the rotation speed of the primary pulley 21 (to be referred to hereafter as a "primary rotation speed Npri"), an output signal from a vehicle speed sensor 43 that detects a traveling speed of the vehicle (to be referred to hereafter as a "vehicle speed VSP"), an output signal from an oil temperature sensor 44 that detects an oil temperature of the continuously variable transmission 4, an output signal from an inhibitor switch 45 that detects a position of a select lever with which the vehicle is provided are input into the input interface 123.

The storage device 122 stores a shift control program for the continuously variable transmission 4 and a shift map used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the continuously variable transmission 4. As a result, the speed ratio vRatio of the variator 20 is modified and the gear position of the subtransmission mechanism 30 is changed, whereby a shift is performed in the continuously variable transmission 4.

Figure 3:
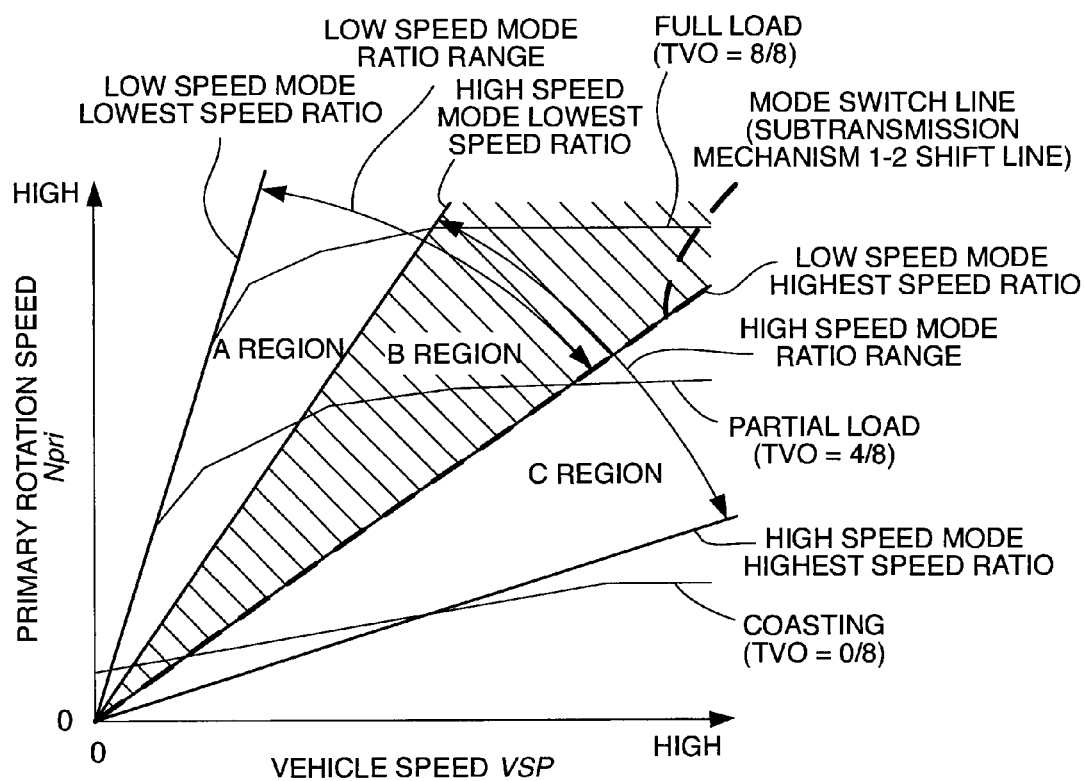
FIG. 3 is a diagram showing shift characteristics of the continuously variable transmission according to this invention.

Referring to FIG. 3, an example of the shift map stored in the storage device 122 of the transmission controller 12 will be described.

On the shift map, an operating point of the continuously variable transmission 4 is determined on the basis of the vehicle speed VSP and the primary rotation speed Npri.

An incline of a line linking the operating point of the continuously variable transmission 4 and a zero point in the lower left corner of the shift map indicates the speed ratio of the continuously variable transmission 4. The incline represents an overall speed ratio obtained by multiplying the speed ratio of the subtransmission mechanism 30 with the speed ratio vRatio of the variator 20, and is referred to hereafter as a "through speed ratio Ratio".

On this shift map, similarly to a shift map of a conventional belt type continuously variable transmission, a shift line is set at each throttle opening TVO, and a shift is performed in the continuously variable transmission 4 according to a shift line selected in accordance with the throttle opening TVO. For ease of understanding, FIG. 3 shows only a full load line used when the throttle opening TVO is 8/8, a partial load line used when the throttle opening TVO is 4/8, and a coasting line used when the throttle opening TVO is 0.

When the continuously variable transmission 4 is in the low speed mode, the continuously variable transmission 4 can be shifted between a low speed mode Lowest line, which is obtained by maximizing the speed ratio vRatio of the variator 20, and a low speed mode Highest line, which is obtained by minimizing the speed ratio vRatio of the variator 20. In the low speed mode, the operating point of the continuously variable transmission 4 moves within an A region and a B region.

When the continuously variable transmission 4 is in the high speed mode, the continuously variable transmission 4 can be shifted between a high speed mode Lowest line, which is obtained by maximizing the speed ratio vRatio of the variator 20, and a high speed mode Highest line, which is obtained by minimizing the speed ratio vRatio of the variator 20. In the high speed mode, the operating point of the continuously variable transmission 4 moves within the B region and a C region.

The speed ratios of the respective gear positions of the subtransmission mechanism 30 are set such that a speed ratio corresponding to the low speed mode Highest line representing a low speed mode Highest speed ratio is smaller than a speed ratio corresponding to the high speed mode Lowest line representing a high speed mode Lowest speed ratio.

In so doing, a low speed mode ratio range, which is the through speed ratio Ratio range of the continuously variable transmission 4 in the low speed mode, and a high speed mode ratio range, which is the through speed ratio Ratio range of the continuously variable transmission 4 in the high speed mode, partially overlap. As a result, when the operating point of the continuously variable transmission 4 is in the B region, which is sandwiched between the high speed mode Lowest line and the low speed mode Highest line, the continuously variable transmission 4 can select either the low speed mode or the high speed mode.

Further, on the shift map, a mode switch line on which a shift is performed in the subtransmission mechanism 30, i.e. a subtransmission mechanism 1-2 shift line in the diagram, is set to overlap the low speed mode Highest speed ratio. A through speed ratio corresponding to the mode switch line (to be referred to hereafter as a "mode switch speed ratio mRatio") is set at an equal value to the low speed mode Highest speed ratio.

When the operating point of the continuously variable transmission 4 crosses the mode switch line, or in other words when the through speed ratio Ratio of the continuously variable transmission 4 varies across the mode switch speed ratio mRatio, the transmission controller 12 performs mode switch control. In the mode switch control, the transmission controller 12 performs a shift in the subtransmission mechanism 30 and modifies the speed ratio vRatio of the variator 20 in an opposite direction to the variation direction of the speed ratio of the subtransmission mechanism 30.

More specifically, when the through speed ratio Ratio of the continuously variable transmission 4 shifts from being larger than the mode switch speed ratio mRatio to being smaller than the mode switch speed ratio mRatio, the transmission controller 12 changes the gear position of the subtransmission mechanism 30 from the first speed to the second speed and modifies the speed ratio vRatio of the variator 20 to the large speed ratio side.

Conversely, when the through speed ratio Ratio of the continuously variable transmission 4 shifts from being smaller than the mode switch speed ratio mRatio to being larger than the mode switch speed ratio mRatio, the transmission controller 12 changes the gear position of the subtransmission mechanism 30 from the second speed to the first speed and modifies the speed ratio vRatio of the variator 20 to the small speed ratio side.

During a mode switch, the speed ratio vRatio of the variator 20 is varied in an opposite direction to the speed ratio variation of the subtransmission mechanism 30 in order to suppress an unpleasant feeling experienced by a driver or passenger of the vehicle due to input rotation variation generated by a sudden change in the through speed ratio Ratio of the continuously variable transmission 4.

Causing the speed ratio of the variator 20 to vary in an opposite direction to the varying direction of the speed ratio of the subtransmission mechanism 30 to suppress a variation in the through speed ratio Ratio in this way is hereinafter referred to as a cooperative speed change.

Next, mode switch shift control executed by the shift controller 12 in order to realize a coordinated shift will be described.

Referring to FIGS. 4A-4F, 5A-5C, 6A-6C, 7, 8A-8C, 9 and 10, mode switch shift control executed in a case where the continuously variable transmission 4 is switched from the low speed mode to the high speed mode will be described.

The control according to this invention is executed to prevent over-speeding caused by a rapid rotation increase in the internal combustion engine 1 when the continuously variable transmission 4 is switched from the low speed mode to the high speed mode. Therefore, in the following description, a value obtained by subtracting a final target rotation speed Nd from the primary pulley rotation speed Npri is used as an excess rotation speed Nb of the internal combustion engine 1 when determining a rapid rotation increase in the internal combustion 1. In other words, using the excess rotation speed Nb as an index, the shift controller 12 performs shift control on the variator 20 to ensure that the excess rotation speed Nb does not exceed a predetermined rotation speed. The final target rotation speed Nd in a case where the continuously variable transmission 4 is switched from the low speed mode to the high speed mode takes a fixed value that does not vary on either side of the mode switch.

Timing charts in FIGS. 4A-4F show mode switch shift control performed when a radial line of the through speed ratio Ratio selected in accordance with the throttle opening TVO crosses the mode switch shift line from a B region to a C region on the shift map shown in FIG. 3.

Figure 4:
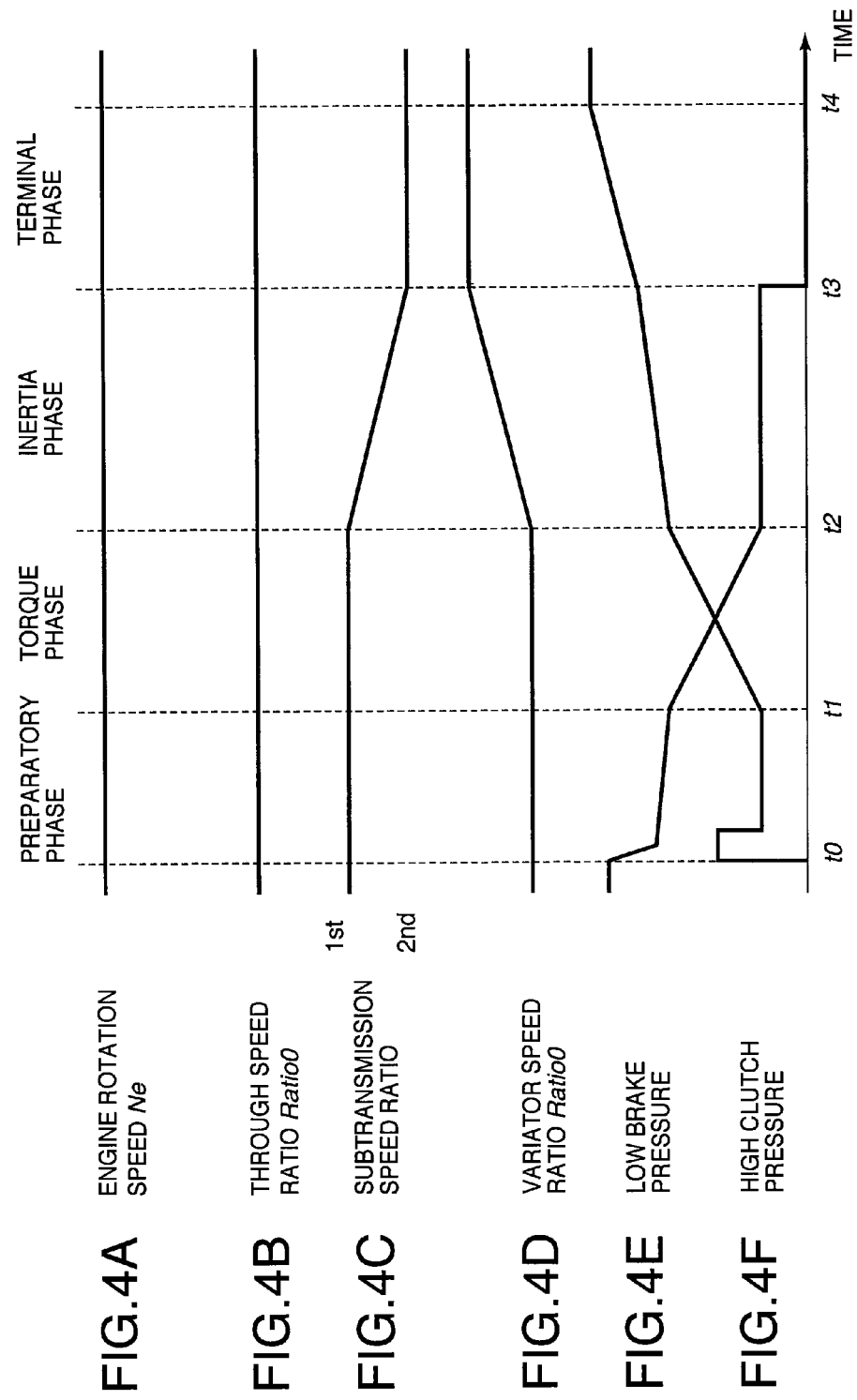
FIGS. 4A-4F are timing charts illustrating a mode switch executed by the shift controller.

The gist of the control can be summarized as follows. A variation speed of the speed ratio of the variator 20, constituted by a belt type continuously variable transmission mechanism, does not rise above a fixed value due to structural reasons, even when the oil pressure of the hydraulic cylinders 23a, 23b is varied within a short time period, and instead, the speed ratio variation speed varies incrementally, as indicated by an inertia phase in FIG. 4D. On the other hand, a gear position switch between the first speed and second speed of the subtransmission mechanism 30, which employs a planetary gear mechanism, through hydraulic control of the High clutch 33 and the Low brake 32 is performed in a shorter amount of time. Therefore, to prevent variation in the through speed ratio Ratio, the gear position of the subtransmission mechanism 30 must be switched at a speed corresponding to the speed ratio variation speed of the variator 20, as shown in FIG. 4C.

For this purpose, the shift controller 12 performs the following control.

After determining that the gear position of the subtransmission mechanism 30 is to be switched from the first speed to the second speed on the basis of the current vehicle conditions, the shift controller 12 begins a preparatory phase for preparing to engage the High clutch 33 and disengage the Low brake 32 at a time to.

In the preparatory phase, the shift controller 12 performs pre-charging to raise the oil pressure of the High clutch 33 serving as an engagement side clutch temporarily, then regulates the oil pressure of the High clutch 33 to a predetermined preparatory oil pressure, and then enters standby. Further, the shift controller 12 regulates the oil pressure of the disengagement side Low brake 32 to a predetermined preparatory oil pressure and then enters standby.

In a torque phase beginning at a time t1, the shift controller 12 performs an operation to increase the oil pressure of the engagement side High clutch 33 gradually from the preparatory oil pressure and reduce the oil pressure of the disengagement side Low brake 32 gradually from the preparatory oil pressure. It should be noted, however, that in the torque phase, the oil pressure of the High clutch 33 and the oil pressure of the Low brake 32 are not varied to the extent that the gear position of the subtransmission mechanism 30 is changed, and therefore the subtransmission mechanism 30 remains at the first speed. The respective oil pressures of the High clutch 33 and the Low brake 32 are controlled to reach predetermined torque phase end oil pressures so that the speed ratio of the subtransmission mechanism 30 begins to vary from the first speed to the second speed at a time t2.

In an inertia phase beginning at the time t2, the shift controller 12 performs oil pressure control on the hydraulic cylinders 23a, 23b to vary the speed ratio vRatio of the variator 20 in an increasing direction. Meanwhile, at the time t2, the speed ratio of the subtransmission mechanism 30 begins to vary from the first speed to the second speed.

The shift controller 12 raises the oil pressure of the High clutch 33 gently from the preparatory oil pressure while maintaining the oil pressure of the Low brake 32 at the preparatory oil pressure, and therefore variation in the gear position of the subtransmission mechanism 30 from the first speed to the second speed cancels out variation in the speed ratio of the variator 20. As a result, as shown in FIG. 4B, the through speed ratio Ratio is maintained at a constant value.

Hence, a coordinated shift is implemented by varying the speed ratio of the subtransmission mechanism 30 in accordance with the variation speed of the speed ratio vRatio of the variator 20 and in an opposite direction thereto.

At a time t3, the subtransmission mechanism 30 finishes shifting from the first speed to the second speed.

In a final phase beginning at the time t3, the shift controller 12 boosts the oil pressure of the High clutch 33 to keep the High clutch 33 in a fully engaged state. On the other hand, the oil pressure of the Low brake 32 is discharged into a drain such that the Low brake 32 is maintained in a fully disengaged state.

At a time t4, the shift controller 12 ends the processing described above, whereby the shift in the subtransmission mechanism 30 from the first speed to the second speed is completed.

In this coordinated shift, the respective speed ratios of the subtransmission mechanism 30 and the variator 20 vary in opposite directions and at an equal speed such that the through speed ratio Ratio does not vary. Hence, as shown in FIG. 4A, during normal travel in the vehicle, the excess rotation speed Nb of the internal combustion engine 1 does not vary during the coordinated shift.

Figure 5:
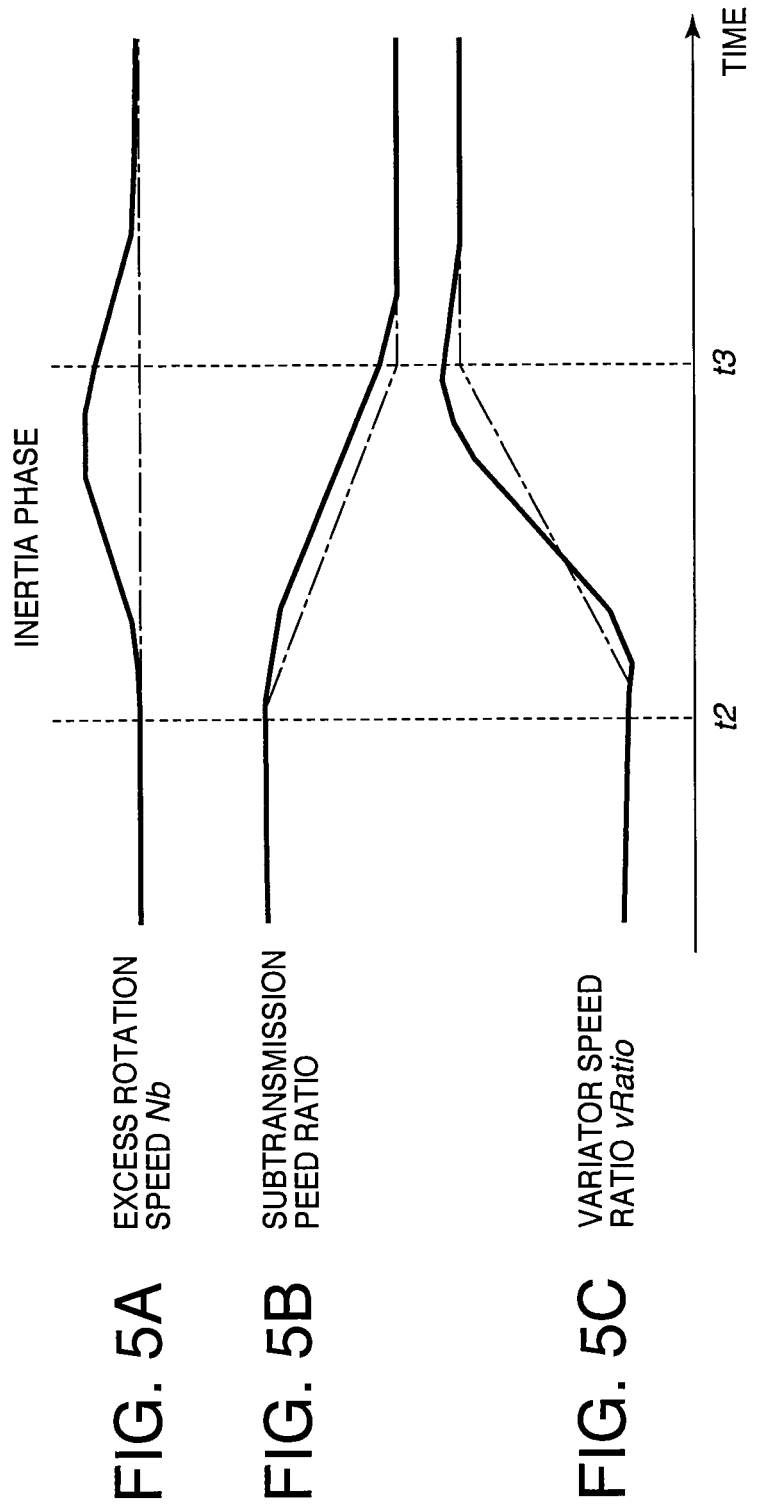
FIGS. 5A-5C are timing charts illustrating speed ratio deviation during the mode switch.

As shown in FIGS. 5A-5C, however, a slight deviation may occur in variation of the respective speed ratios of the subtransmission mechanism 30 and the variator 20 due to a control delay in the hydraulic circuit or a timing deviation during engagement or disengagement of the clutch or brake.

Referring to FIGS. 5A-5C, during a coordinated shift performed when the accelerator opening TVO is not zero, the through speed ratio Ratio varies when the shift in the subtransmission mechanism 30 is delayed, as shown by a solid line in FIG. 5B, or when the shift in the variator 20 is early, as shown by a solid line in FIG. 5C, and as a result, the excess rotation speed Nb exhibits an increase, as shown by a solid line in FIG. 5A. Dot-dash lines in FIGS. 5A-5C indicate target variation, while solid lines indicate possible deviations. To suppress variation in the through speed ratio Ratio under these conditions, the shift controller 12 performs the following control.

When variation in the speed ratio of the subtransmission mechanism 30 is later than normal, as shown by the solid line in FIG. 5B, and/or when variation in the speed ratio vRatio of the variator 20 is earlier than normal, as shown in FIG. 5C, the through speed ratio Ratio varies, leading to an increase in the excess rotation speed Nb. If this phenomenon occurs when the accelerator opening TVO is large, for example when the vehicle is traveling at high speed, a rapid rotation increase may occur in the internal combustion engine 1, leading to over-speeding.

Hence, the shift controller 12 performs control to prevent a rapid rotation increase in the internal combustion engine by suppressing variation in the through speed ratio Ratio during a coordinated shift.

Figure 6:
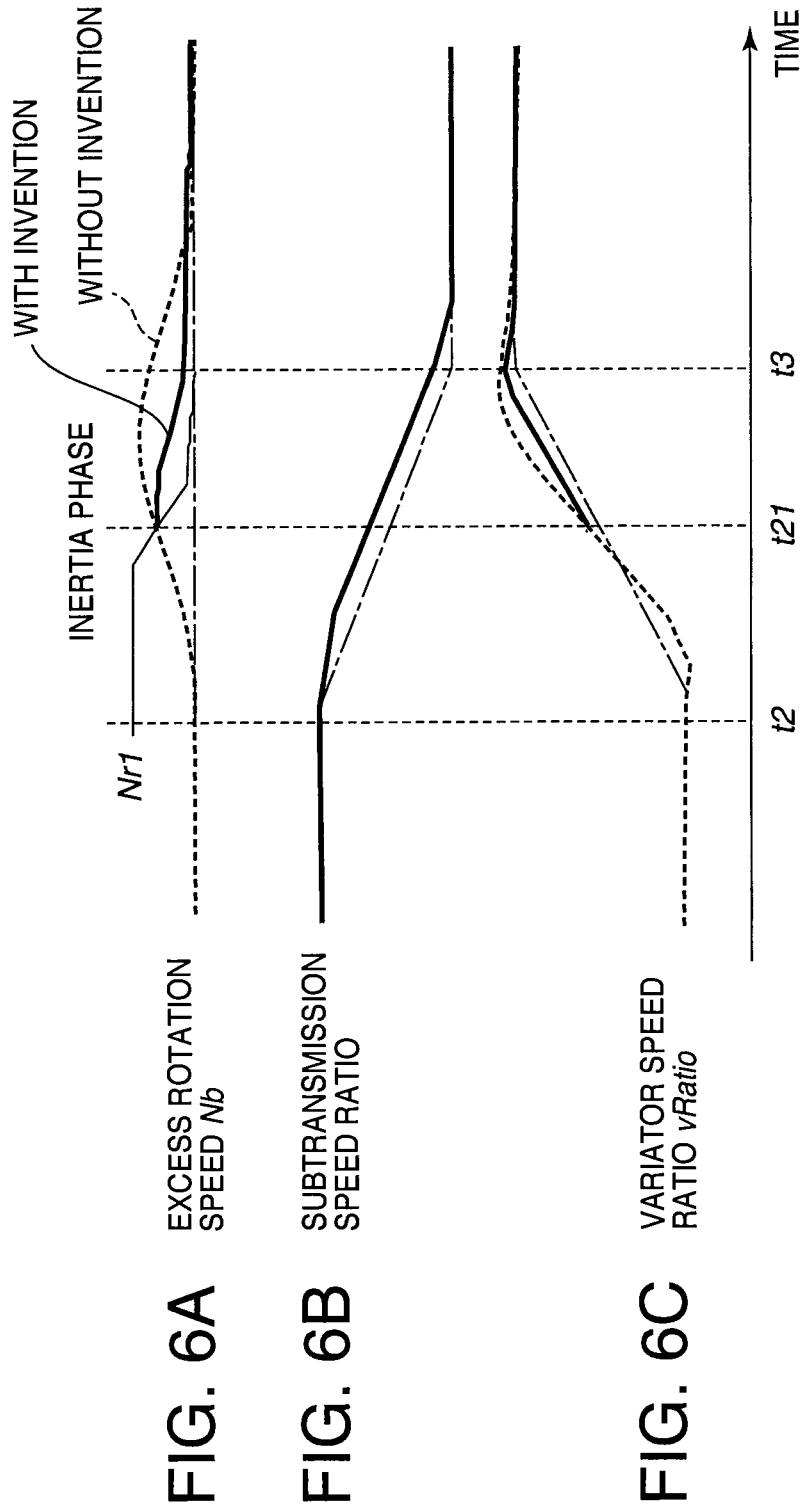
FIGS. 6A-6C are timing charts illustrating an outline of shift control executed by the shift controller in relation to a rapid rotation increase in an internal combustion engine.

Referring to FIGS. 6A-6C, when variation in the speed ratio of the subtransmission mechanism 30 is later than normal, as shown by a solid line in FIG. 6B, and when variation in the speed ratio vRatio of the variator 20 is earlier than normal, as shown by a dotted line in FIG. 6C, the excess rotation speed Nb of the internal combustion engine 1 increases, as shown by a dotted line in FIG. 6A.

During the inertia phase, the shift controller 12 compares the excess rotation speed Nb to a first determination rotation speed Nr1, and when the excess rotation speed Nb exceeds the first determination rotation speed Nr1 at a time t21, the shift controller 12 determines that the internal combustion engine 1 is exhibiting a tendency toward a rapid rotation increase. Accordingly, the shift controller 12 reduces the shift speed of the speed ratio vRatio of the variator 20 as shown by a solid line in FIG. 6C, by regulating the oil pressure supplied to the hydraulic cylinders 23a, 23b.

Figure 7:
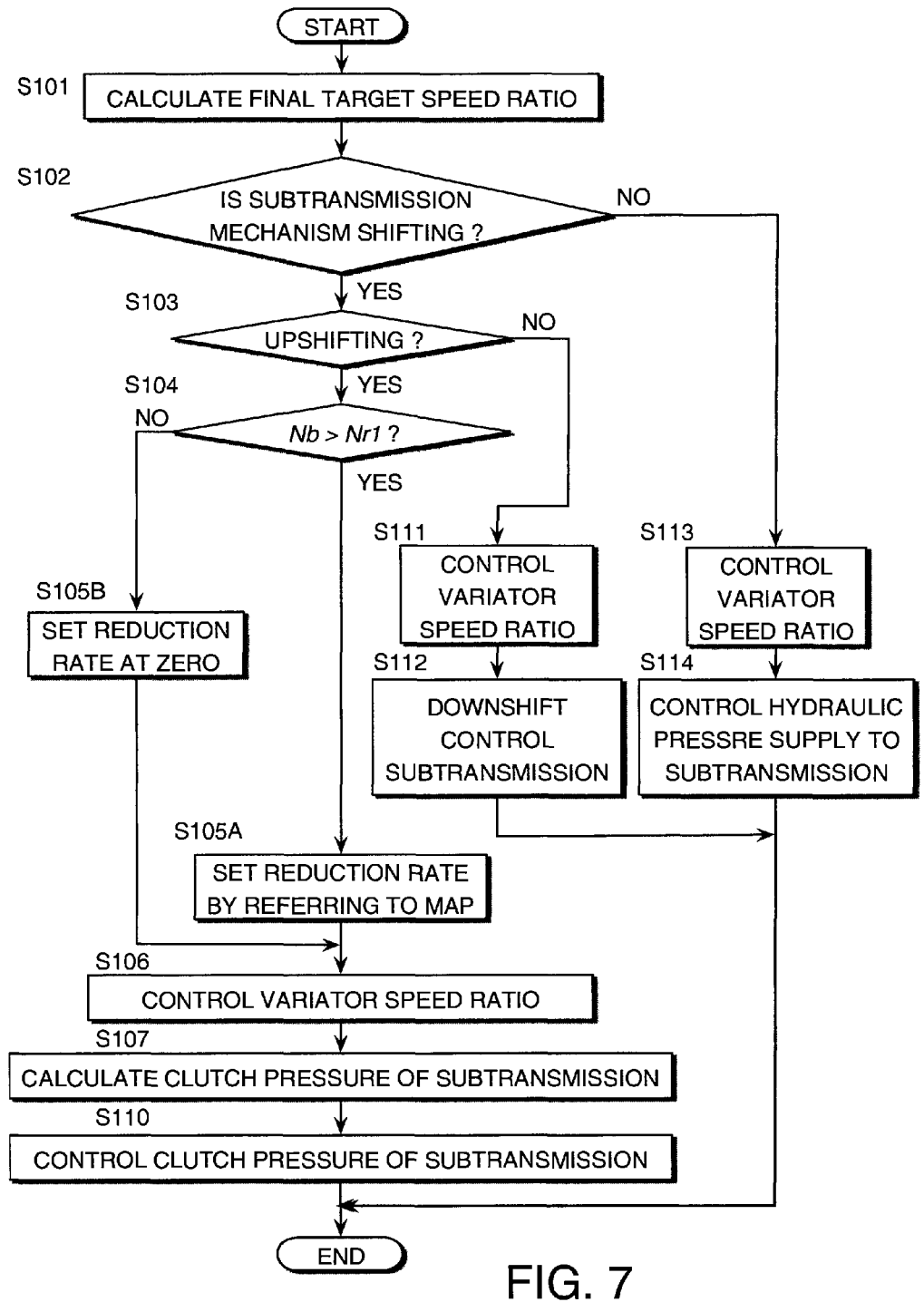
FIG. 7 is a flowchart illustrating a shift control routine executed by the shift controller.

Referring to FIG. 7, a shift control routine executed by the shift controller 12 to realize this control will be described. This routine is executed repeatedly at fixed time intervals, for example 10 millisecond intervals, while the vehicle travels.

In a step S101, the shift controller 12 obtains data relating to the traveling conditions of the vehicle. The data include the throttle opening TVO, the vehicle speed VSP, the primary pulley rotation speed Npri, and the internal combustion engine rotation speed Ne. The shift controller 12 then calculates a final target speed ratio Ratio0 from the vehicle speed VSP, primary pulley rotation speed Npri, and throttle opening TVO by referring to a map having the characteristics shown in FIG. 3 and stored in the storage device 122 in advance.

In a step S102, the shift controller 12 determines whether or not mode switch shift control is underway in the subtransmission mechanism 30.

When it is determined that mode switch shift control from the first speed to the second speed or from the second speed to the first speed is underway in the subtransmission mechanism 30, the shift controller 12 performs the processing of a step S103. When it is determined, on the other hand, that mode switch shift control is not underway in the subtransmission mechanism 30, or in other words that the subtransmission mechanism 30 is held at the first speed or the second speed, the shift controller 12 performs the processing of a step S113.

In the step S113, the shift controller 12 executes shift control on the variator 20 on the basis of the final target speed ratio Ratio0. Here, the speed ratio of the subtransmission mechanism 30 corresponds to the first speed or the second speed unless mode switch shift control is underway, and therefore the shift controller 12 performs control to align the through speed ratio Ratio with the final target speed ratio Ratio0 by controlling the speed ratio vRatio of the variator 20 alone.

Next, in a step S114, the shift controller 12 executes oil pressure control to maintain an engagement force of the High clutch 33 and the Low brake 32 so that a current shift position of the subtransmission mechanism 30 is maintained. Following the processing of the step S114, the shift controller 12 terminates the routine.

In the step S103, meanwhile, the shift controller 12 determines whether or not the shift currently executed in the subtransmission mechanism 30 is an upshift, or in other words whether or not a mode switch is underway from the first speed of the low speed mode to the second speed of the high speed mode.

When the determination is negative, or in other words when it is determined that a mode switch is underway from the second speed of the high speed mode to the first speed of the low speed mode, the shift controller 12 performs the processing of a step S111.

In the step S111, the shift controller 12 executes shift control to perform a downshift in the variator 20.

Next, in a step S112, the shift controller 12 executes oil pressure control to control the engagement force of the High clutch 33 and the Low brake 32 so that a downshift is performed in the subtransmission mechanism 30. Following the processing of the step S112, the shift controller 12 terminates the routine.

When, on the other hand, the determination of the step S103 is affirmative, or in other words when it is determined that a mode switch is underway from the first speed of the low speed mode to the second speed of the high speed mode, the shift controller 12 performs the processing of a step S104.

In the step S104, the shift controller 12 determines whether or not the excess rotation speed Nb of the internal combustion engine 1, which is calculated from the current engine rotation speed Ne, exceeds the first determination rotation speed Nr1. As described above, the excess rotation speed Nb is obtained by subtracting the final target rotation speed Nd from the primary pulley rotation speed Npri. The final target rotation speed Nd is a rotation speed of the internal combustion engine 1 corresponding to the final target speed ratio Ratio0. It should be noted that when a mode switch is underway from the first speed of the low speed mode to the second speed of the high speed mode, the final target rotation speed Nd is not varied but maintained at a value immediately prior to the mode switch.

Figure 9:
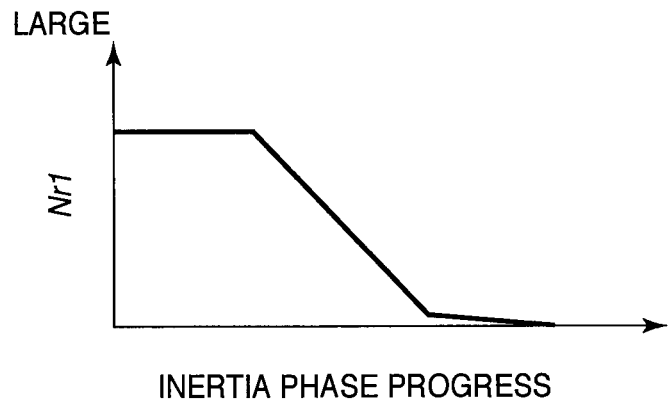
FIG. 9 is a diagram showing characteristics of a map of the first determination rotation speed, which is stored by the shift controller.

The shift controller 12 reads the first determination rotation speed Nr1 corresponding to the progression of the inertia phase by referring to a map having the characteristics shown in FIG. 9 and stored in the storage device 122 in advance. The shift controller 12 then compares the excess rotation speed Nb to the read first determination rotation speed Nr1.

When the excess rotation speed Nb exceeds the first determination rotation speed Nr1 in the step S104, the shift controller 12 performs the processing of a step S105A followed by the processing of a step S106. When the excess rotation speed Nb does not exceed the first determination rotation speed Nr1, the shift controller 12 performs the processing of a step S105B followed by the processing of the step S106.

Figure 10:
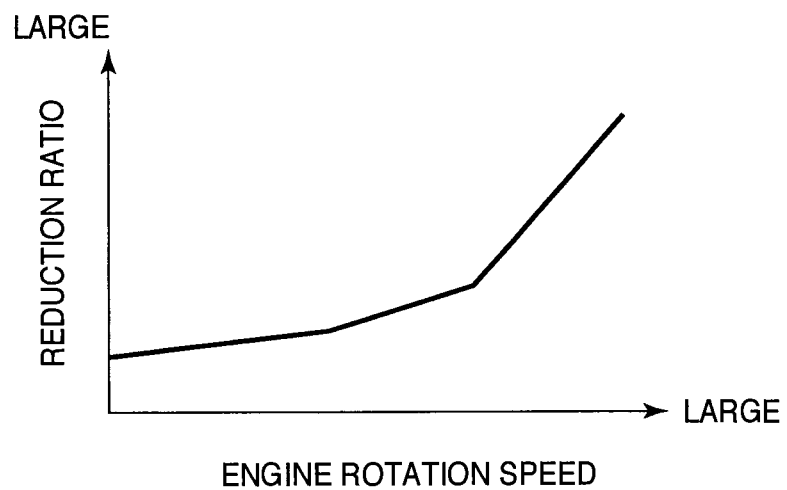
FIG. 10 is a diagram showing characteristics of a variator speed ratio delay map stored by the shift controller.

In the step S105A, the shift controller 12 determines a delay in the speed ratio variation of the variator 20 on the basis of the engine rotation speed Ne by referring to a map having the characteristics shown in FIG. 10 and stored in the storage device 122 in advance.

Referring back to FIGS. 6A-6C, when variation in the speed ratio of the subtransmission mechanism 30 is later than normal, as shown by the solid line in FIG. 6B, the excess rotation speed Nb increases, as shown by the dotted line in FIG. 6A. To prevent this, speed ratio variation in the variator 20 must be delayed from the time t21, i.e. the point where the determination of the step S104 becomes affirmative. More specifically, speed ratio variation in the variator 20 can be delayed by reducing the variation speed of the variator speed ratio vRatio. An ordinate on the diagram in FIG. 10 shows a reduction rate thereof. As the reduction rate increases, the delay in speed ratio variation in the variator 20 increases.

In FIG. 10, the reason why the reduction rate is increased as the engine rotation speed Ne rises is that as the engine rotation speed Ne rises, a deviation in speed ratio variation between the subtransmission mechanism 30 and the variator 20 becomes more likely to cause over-speeding in the internal combustion engine 1.

In the step S105B, on the other hand, the shift controller 12 sets the reduction rate at zero.

In the step S106, the shift controller 12 applies the reduction rate set in the step S105A or S105B to set a target speed ratio of the variator 20, and then controls the oil pressure of the hydraulic cylinders 23a and 23b such that the speed ratio of the variator 20 matches the target speed ratio.

Next, in a step S107, the shift controller 12 calculates oil pressure to be supplied to the High clutch 33 and the Low brake 32 in order to execute an upshift in the subtransmission mechanism 30 from the first speed to the second speed.

Next, in a step S110, the shift controller 12 supplies the calculated oil pressure to the High clutch 33 and the Low brake 32. Following the processing of the step S110, the shift controller 12 terminates the routine.

When the excess rotation speed Nb exceeds the first determination rotation speed Nr1 at the time t21 during the coordination control executed in the above routine, the shift controller 12 reduces the variation speed of the speed ratio vRatio of the variator 20 to delay speed ratio variation in the variator 20, as shown by the solid line in FIG. 6C. This delay causes the primary pulley rotation speed Npri to decrease, and therefore the excess rotation speed Nb is suppressed to or below the first determination rotation speed Nr1, as shown by the solid line in FIG. 6A. Hence, as shown in FIG. 6B, even when variation in the speed ratio of the subtransmission mechanism 30 is later than normal, as shown by the solid line in FIG. 6A, the excess rotation speed Nb can be suppressed to or below the first determination rotation speed Nr1, and as a result, an excessive rotation increase in the internal combustion engine 1 can be prevented. By performing similar control when variation in the speed ratio vRatio of the variator 20 is earlier than normal, as shown by the dotted line in FIG. 6C, the variation speed of the speed ratio vRatio can be reduced, and as a result, the excess rotation speed Nb can be suppressed to or below the first determination rotation speed Nr1, thereby preventing an excessive rotation increase in the internal combustion engine 1.

The first determination rotation speed Nr1 will now be described. The map shown in FIG. 9 is set such that after the start of the inertia phase, the value of the first determination rotation speed Nr1 decreases as the inertia phase progresses. The reason for this is as follows.

Figure 8:
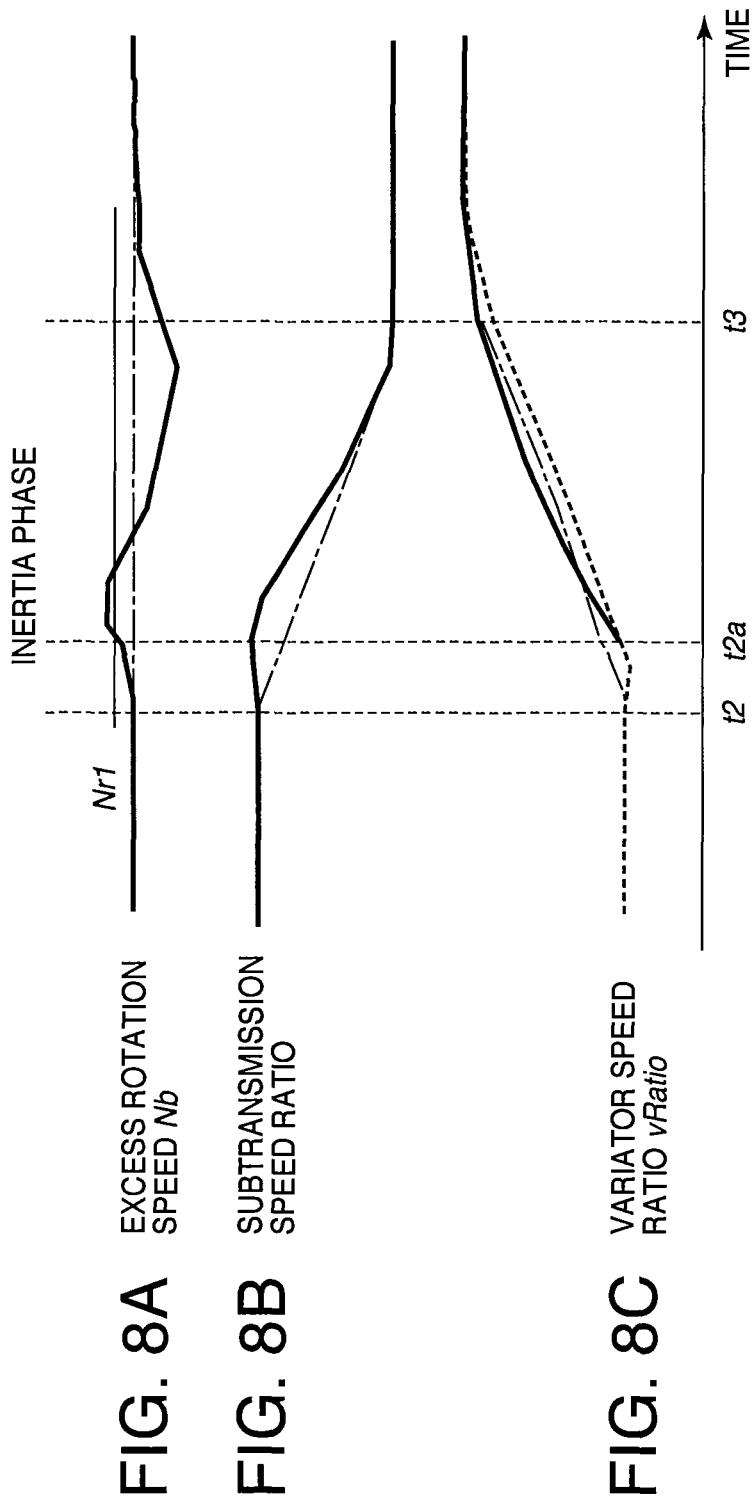
FIGS. 8A-8C are timing charts illustrating variation in an engine rotation speed when a first determination rotation speed is set at a fixed value during the shift control routine.

Referring to FIGS. 8A-8C, if the first determination rotation speed Nr1 is set at a fixed value regardless of the progression of the inertia phase, the excess rotation speed Nb exceeds the first determination rotation speed Nr1 at a time 2a during the initial period of the inertia phase when variation in the speed ratio of the subtransmission mechanism 30 is later than normal, as shown by a solid line in FIG. 8B. On the other hand, when the shift speed of the variator 20 begins to decrease from the initial period of the inertia phase, as shown by a dotted line in FIG. 8C, the reduction in the shift speed of the variator 20 becomes excessive in a latter period of the inertia phase, causing the excess rotation speed Nb to take a negative value, as shown in FIG. 8A. In other words, the primary pulley rotation speed Npri falls below the final target rotation speed Nd, and as a result, the rotation speed Ne of the internal combustion engine 1 may decrease greatly.

In contrast, when the first determination rotation speed Nr1 is set to be large in the initial period of the inertia phase and to decrease in the latter period in accordance with the map shown in FIG. 9, the shift speed of the variator 20 is less likely to decrease in the initial period of the inertia phase and more likely to decrease in the latter period of the inertia phase. By varying the first determination rotation speed Nr1 in accordance with the progression of the inertia phase in this manner, over-speeding and an excessive rotation speed reduction in the internal combustion engine 1 can both be prevented when the continuously variable transmission 4 switches from the low speed mode to the high speed mode, and as a result, stability can be maintained in the rotation speed Ne of the internal combustion engine 1.

Referring to FIGS. 11A-11D, 12 and 13, a second embodiment of this invention will be described.

The continuously variable transmission 4 according to this embodiment is identical to the continuously variable transmission 4 according to the first embodiment with respect to its hardware configuration. The difference between this embodiment and the second embodiment is that in this embodiment, the shift controller 12 executes a shift control routine shown in FIG. 13 instead of the shift control routine shown in FIG. 7.

Figure 13:
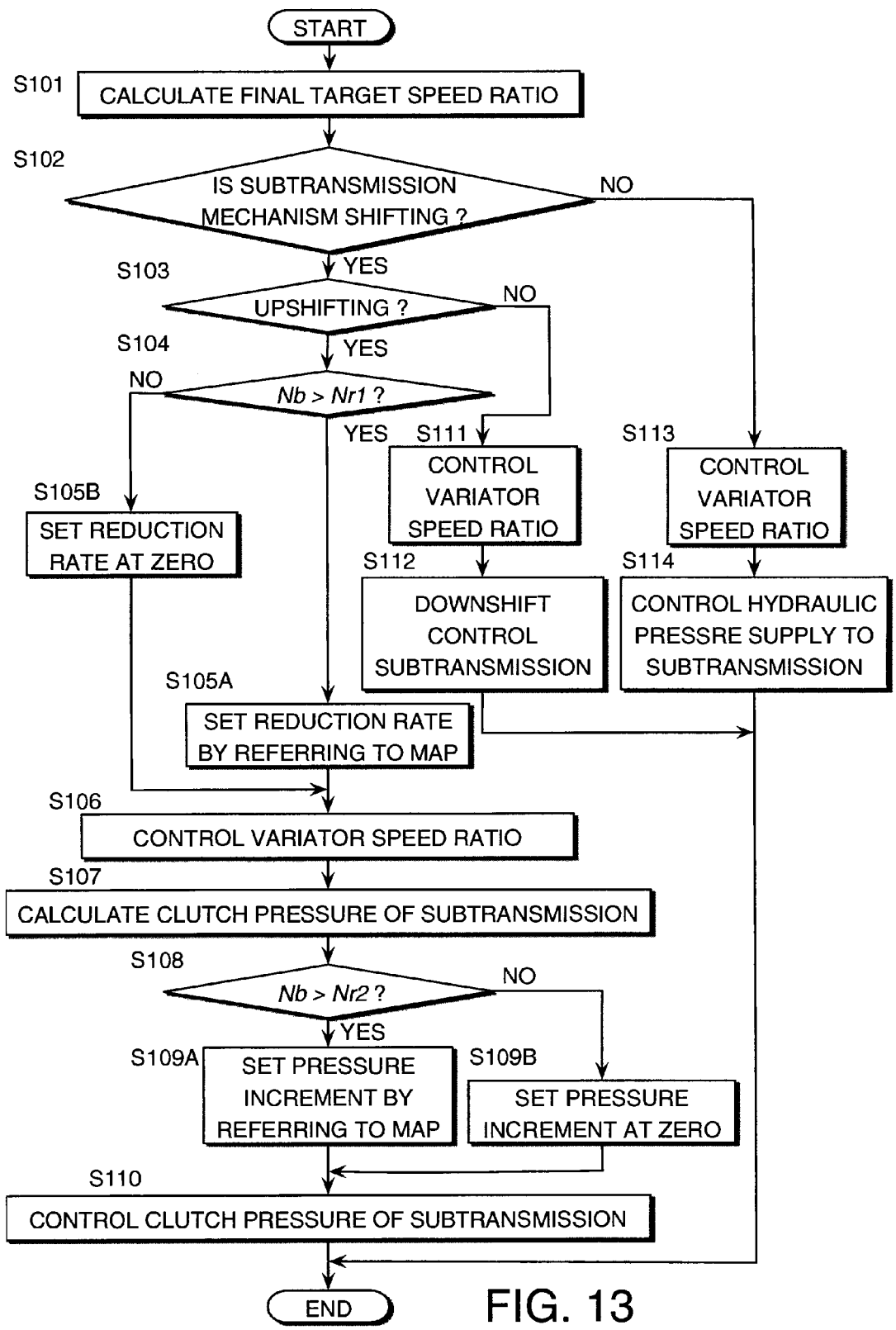
FIG. 13 is a flowchart illustrating a shift control routine executed by the shift controller according to the second embodiment of this invention.

The shift control routine shown in FIG. 13 differs from the shift control routine according to the first embodiment, shown in FIG. 7, in the addition of a step S108 and steps S109A, S109B between the step S107 and the step S110. The processing of the steps S101-S107 and S110-S114 is identical to that of the shift control routine according to the first embodiment, shown in FIG. 7, and therefore description thereof has been omitted.

Referring to FIG. 13, in the step S108, the shift controller 12 determines whether or not the excess rotation speed Nb exceeds a second determination rotation speed Nr2. Here, the second determination rotation speed Nr2 is a value obtained by adding a fixed value to the first determination rotation speed Nr1.

More specifically, the shift controller 12 calculates the second determination rotation speed Nr2 corresponding to the progression of the inertia phase, and compares the second determination rotation speed Nr2 with the excess rotation speed Nb.

When it is determined in the step S108 that the excess rotation speed Nb exceeds the second determination rotation speed Nr2, the shift controller 12 executes control to accelerate speed ratio variation in the subtransmission mechanism 30 in the step S109A.

Figure 12:
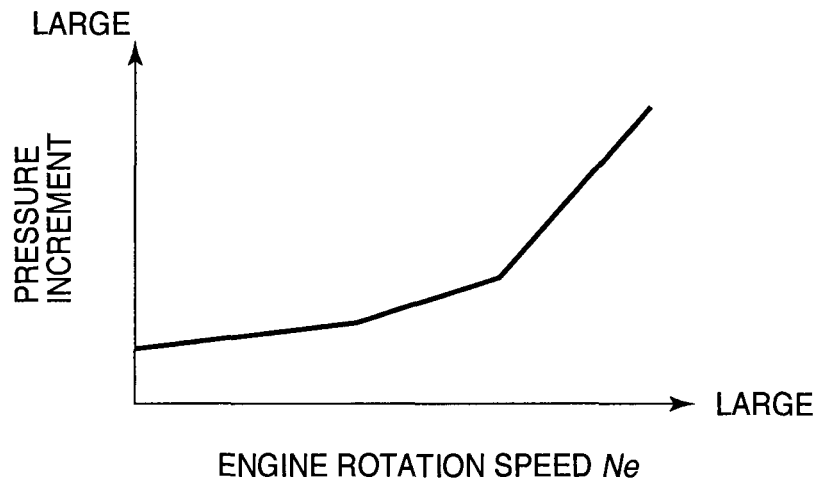
FIG. 12 is a diagram showing characteristics of a map of an engagement oil pressure boost amount, which is stored by the shift controller according to the second embodiment of this invention.

More specifically, the shift controller 12 searches for a boost amount relative to an engagement oil pressure of the High clutch 33 during a normal mode switch shift in the subtransmission mechanism 30 on the basis of the engine rotation speed Ne by referring to a map having the characteristics shown in FIG. 12 and stored in the storage device 122 in advance. Here, the boost amount is a boost amount required to engage the High clutch 33 immediately. In FIG. 12, the reason why the boost amount is increased as the engine rotation speed Ne rises is the same as the reason why the reduction rate is increased as the engine rotation speed Ne rises in FIG. 10, i.e. because as the engine rotation speed Ne rises, a deviation in speed ratio variation between the subtransmission mechanism 30 and the variator 20 becomes more likely to cause over-speeding in the internal combustion engine 1.

When it is determined in the step S108 that the excess rotation speed Nb does not exceed the second determination rotation speed Nr2, the shift controller 12 sets the boost amount at zero in the step S109B.

Next, in the step S110, the shift controller 12 adds the boost amount calculated in the step S109A or the step S109B to the obtained engagement oil pressure of the High clutch 33 during a normal mode switch shift. The shift controller 12 then controls the engagement oil pressure of the High clutch 33 to the added oil pressure. Here, incrementing the oil pressure control amount by a boost amount other than zero corresponds to accelerating the mode switch in the subtransmission mechanism 30.

Following the processing of the step S110, the shift controller 12 terminates the routine.

Referring to FIGS. 11A-11D, in this embodiment, similarly to the first embodiment, the shift controller 12 employs the above control to reduce the shift speed of the variator 20 when the excess rotation speed Nb is greater than the first determination rotation speed Nr1 at the time t21, thereby delaying shifting of the variator 20. However, when the progress of the mode switch in the subtransmission mechanism 30 is greatly delayed, for example, it may be impossible to suppress an increase in the excess rotation speed Nb simply by controlling the shift speed of the variator 20.

Figure 11:
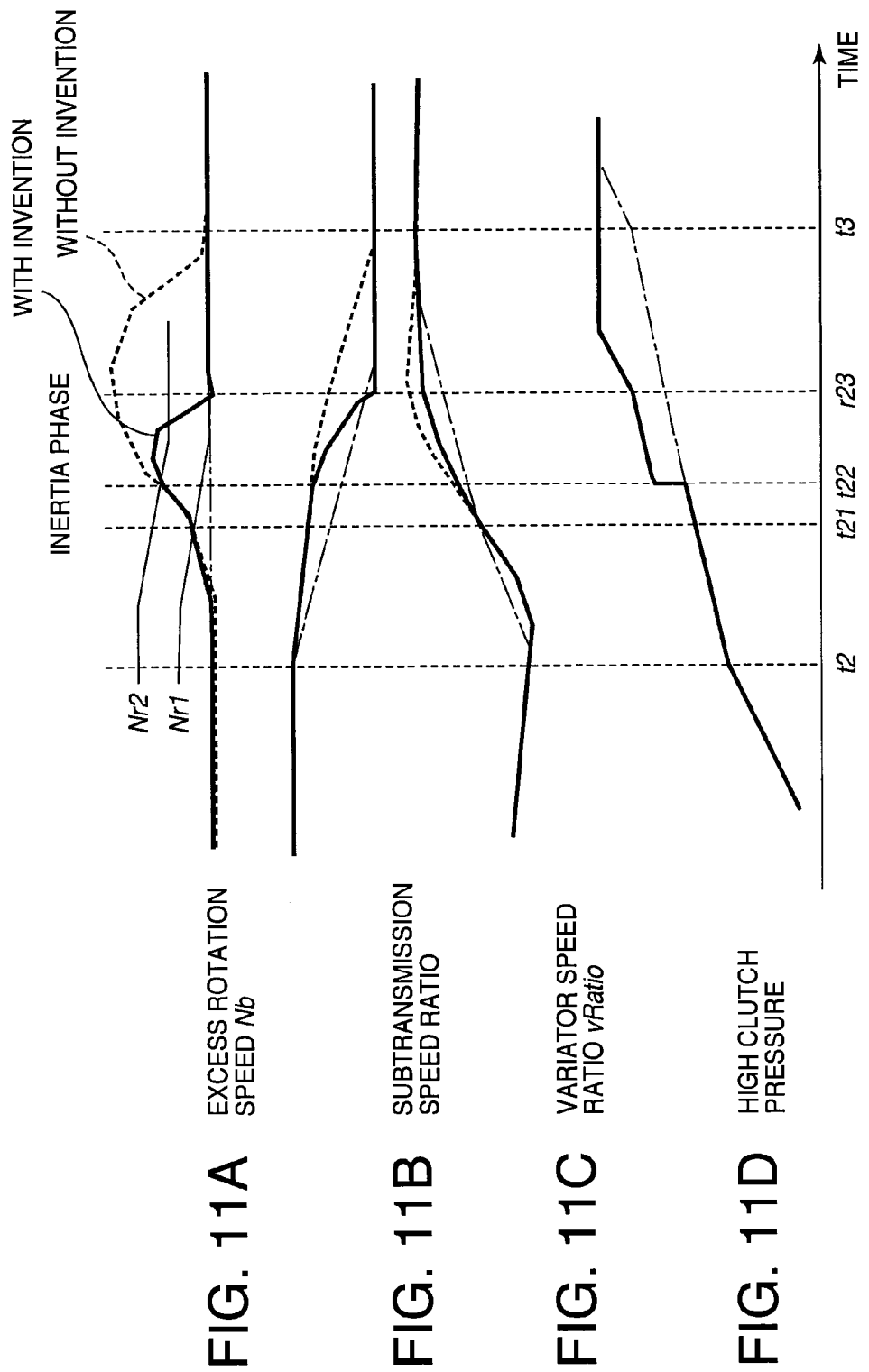
FIGS. 11A-11D are timing charts illustrating an outline of shift control executed by a shift controller according to a second embodiment of this invention in relation to a rapid rotation increase in the internal combustion engine.

In this case, as shown in FIG. 11A, when the excess rotation speed Nb is greater than the second determination rotation speed Nr2 at a time t22, the shift controller 12 adds the boost amount based on the engine rotation speed Ne to the control amount relating to the oil pressure supplied to the subtransmission mechanism 30, and as a result, speed ratio variation in the subtransmission mechanism 30 accelerates in stepped fashion, as shown by a solid line in FIG. 11D. More specifically, the pressure supplied to the High clutch 33 is increased such that the engagement pressure of the High clutch 33 increases.

Hence, as shown in FIG. 11B, the mode switch in the subtransmission mechanism 30 is accelerated, as shown by a solid line in FIG. 11B, and as a result, the excess rotation speed Nb decreases rapidly toward zero. Therefore, according to this embodiment, a rapid rotation increase in the internal combustion engine 1 accompanying a switch in the continuously variable transmission 4 from the low speed mode to the high speed mode can be prevented more reliably. It should be noted that when the mode switch in the subtransmission mechanism 30 is accelerated, engagement shock may occur in the High clutch 33, but here, priority is placed on the prevention of over-speeding in the internal combustion engine 1, and therefore suppression of the excess rotation speed Nb is prioritized over the prevention of engagement shock.

Referring to FIGS. 14A-14D, 15 and 16, a third embodiment of this invention will be described.

In the second embodiment, the oil pressure of the engagement side High clutch 33 of the subtransmission mechanism 30 is raised to the oil pressure required to engage the High clutch 33 immediately when the excess rotation speed Nb exceeds the second determination rotation speed Nr2.

In this embodiment, on the other hand, the shift speed of the subtransmission mechanism 30 is increased by increasing the speed at which a rotation speed of the output shaft of the subtransmission mechanism 30 achieves a target output rotation speed. The rotation speed of the output shaft of the subtransmission mechanism 30 is calculated from an output signal of the vehicle speed sensor 43.

Other constitutions of this embodiment, including the hardware configuration, are identical to those of the second embodiment.

During the inertia phase, the shift controller 12 calculates a command value of the oil pressure to be supplied to the High clutch 33 and the Low brake 32 by performing feedback-control based on a deviation between the rotation speed of the output shaft of the subtransmission mechanism 30 and the target output rotation speed.

When the excess rotation speed Nb exceeds the second determination rotation speed Nr2, the shift controller 12 corrects the command value of the oil pressure to be supplied to the High clutch 33 so that the subtransmission mechanism 30 achieves the target rotation speed more quickly.

Referring to FIGS. 14A-14D, during a normal coordinated shift, the speed ratio of the subtransmission mechanism 30 and the speed ratio vRatio of the variator 20 vary in opposite directions, as shown by a thin dot-dash line.

As shown by dotted lines in FIGS. 14A and 14B, when variation in the speed ratio of the subtransmission mechanism 30 is later than normal or when variation in the speed ratio vRatio of the variator 20 is earlier than normal during the inertia phase, the through speed ratio Ratio increases, causing the internal combustion engine rotation speed Ne to increase. As a result, the excess rotation speed Nb also rises, as shown in FIG. 14A.

When the excess rotation speed Nb exceeds the first determination rotation speed Nr1 at the time t21, the shift controller 12 reduces the shift speed of the variator 20 by delaying variation in the speed ratio vRatio of the variator 20, similarly to the first and second embodiments.

When the internal combustion engine rotation speed Ne continues to rise in spite of the reduction in the shift speed of the variator 20, the internal combustion engine rotation speed rises further, as shown by a thick solid line in FIG. 14A and the excess rotation speed Nb exceeds the second determination rotation speed Nr2 at the time t22, the shift controller 12 executes control to increase the shift speed of the subtransmission mechanism 30.

Figure 15:
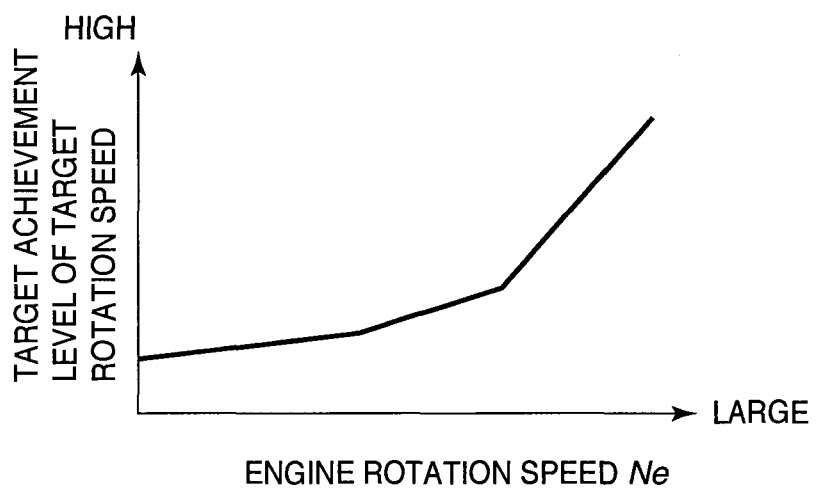
FIG. 15 is a diagram showing characteristics of a map of a target achievement level of a target rotation speed, which is stored by the shift controller according to the third embodiment of this invention.

More specifically, the shift controller 12 sets a target shift speed, as shown by a thin solid line in FIG. 14B, by referring to a map having the characteristics shown in FIG. 15 and stored in the storage device 122 in advance, so that the subtransmission mechanism 30 achieves the target rotation speed more quickly. As described above with respect to FIGS. 10 and 12, a deviation in speed ratio variation between the subtransmission mechanism 30 and the variator 20 becomes more likely to cause over-speeding in the internal combustion engine 1 as the engine rotation speed Ne rises. Therefore, the map shown in FIG. 15 is set such that the subtransmission mechanism 30 achieves the target rotation speed steadily more quickly as the internal combustion engine rotation speed Ne increases.

The shift controller 12 performs feedback-control on the engagement oil pressure of the High clutch 33 on the basis of a deviation between a rotation speed based on a target achievement level corrected using the map of FIG. 15 and an actual rotation speed of the subtransmission mechanism 30. As a result, the engagement oil pressure of the High clutch 33 increases as shown by a dotted line in FIG. 14D, and thus the subtransmission mechanism 30 achieves the target rotation speed more quickly.

With the above control, large variation in the through speed ratio Ratio can be suppressed, and as a result, over-speeding caused by a rapid rotation increase in the internal combustion engine 1 can be prevented.

Figure 16:
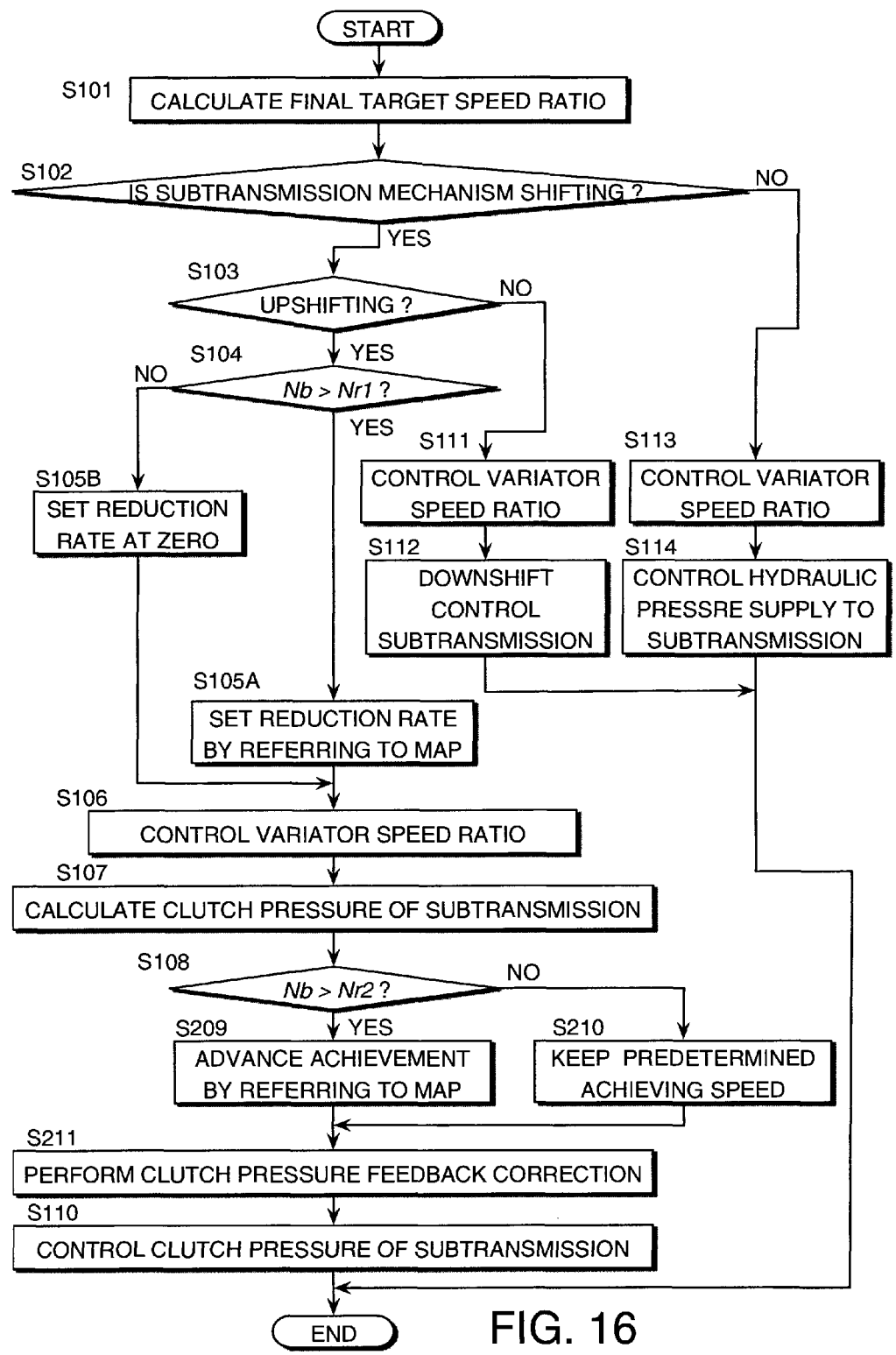
FIG. 16 is a flowchart illustrating a shift control routine executed by the shift controller according to the third embodiment of this invention.

Referring to FIG. 16, a shift control routine executed by the shift controller 12 to realize the above control will now be described.

This routine corresponds to the shift control routine of FIG. 13 with the addition of steps S209-S211 in place of the steps S108, S109A and S109B. All other steps are identical to their counterparts in the shift control routine of FIG. 13.

When the excess rotation speed Nb exceeds the second determination rotation speed Nr2 in the step S108, the shift controller 12 calculates, in the step S210, a target achievement level toward the target output variation speed in accordance with a predetermined achievement speed. Following the processing of the step S210, the shift controller 12 performs the processing of the step S211.

When the excess rotation speed Nb exceeds the second determination rotation speed Nr2 in the step S108, the shift controller 12 corrects the target achievement level toward the target output rotation speed to an increased side in the step S209 so that the subtransmission mechanism 30 achieves the target output rotation speed more quickly.

More specifically, the target achievement level toward the target output rotation speed of the subtransmission mechanism 30 corresponding to the current internal combustion engine rotation speed Ne is determined by referring to the map of FIG. 15, and the target achievement level calculated during execution of a previous routine is replaced by the determined target achievement level. Following the processing of the step S209, the shift controller 12 performs the processing of the step S211.

In the step S211, the shift controller 12 calculates the engagement oil pressure of the High clutch 33 by performing feedback control based on a deviation between the actual rotation speed of the output shaft of the subtransmission mechanism 30 and an interim target rotation speed obtained from the target output rotation speed and the target achievement level.

Finally, in the step S110, the shift controller 12 controls the engagement force of the High clutch 33 in a similar manner to the second embodiment on the basis of the value calculated in the step S211. Following the processing of the step S110, the shift controller 12 terminates the routine.

With regard to the control executed by the shift controller 12 on the subtransmission mechanism 30 in the second and third embodiments, only control of the engagement oil pressure of the High clutch 33 was described, and the reason for this is that the shift controller 12 performs shift speed control on the subtransmission mechanism 30 through control of the engagement oil pressure of the High clutch 33 alone. In parallel with control of the engagement oil pressure of the High clutch 33, the shift controller 12 also controls the pressure of the Low brake 32. In the second and third embodiments, this control is invariably performed in accordance with the pattern shown in FIG. 4E, and Low brake pressure control for advancing shifting of the subtransmission mechanism 30 is not performed. However, shifting of the subtransmission mechanism 30 may be advanced by controlling the pressure of the Low brake.

The contents of Tokugan 2009-169163, with a filing date of Jul. 17, 2009 in Japan, are hereby incorporated by reference.

Although the invention has been described above with reference to certain embodiments of the invention, the invention is not limited to the embodiments described above.

Modifications and variations of the embodiments described above will occur to those skilled in the art, within the scope of the claims.

The embodiments of this invention in which an exclusive property or privilege is claimed are defined as follows:

What is claimed is:

1. A control device for a continuously variable transmission that is connected to an internal combustion engine installed in a vehicle, the continuously variable transmission comprising a continuously variable transmission mechanism that modifies a speed ratio continuously and a subtransmission mechanism that is connected in series with the continuously variable transmission mechanism and includes, as vehicle forward advancing gear positions, a first gear position and a second gear position having a smaller speed ratio than the first gear position, the control device comprising:

a rotation speed sensor that detects an engine rotation speed of the internal combustion engine; and a shift controller programmed to:

perform a cooperative speed change in which the speed ratio of the continuously variable transmission mechanism is controlled in an opposite direction to a speed ratio variation of the subtransmission mechanism;

determine if a rapid increase in the engine rotation speed has occurred during the cooperative speed change; and reduce a shift speed of the continuously variable transmission mechanism when the rapid increase has occurred with respect to an occasion when the rapid increase has not occurred, during the cooperative speed change when a shifting process for shifting the subtransmission mechanism from the first gear position to the second gear position is conducted.

2. The control device as defined in claim 1, wherein the controller is further programmed to determine that the rapid increase has occurred during the cooperative speed change when an excess rotation speed obtained by subtracting a target rotation speed from the engine rotation speed exceeds a first determination value during the cooperative speed change.

3. The control device as defined in claim 2, wherein the controller is further programmed to increase a reduction rate of the shift speed of the continuously variable transmission mechanism as the rotation speed of the internal combustion engine rises.

4. The control device as defined in claim 2, wherein the controller is further programmed to determine whether or not the excess rotation speed exceeds a second determination value which is larger than the first determination value, and accelerate the speed ratio variation of the subtransmission mechanism when the excess rotation speed exceeds the second determination value.

5. The control device as defined in claim 4, wherein the controller is further programmed to increase an acceleration rate of the speed ratio variation of the subtransmission mechanism as the rotation speed of the internal combustion engine rises.

6. The control device as defined in claim 4, wherein the subtransmission mechanism is configured to perform a switch from the first gear position to the second gear position in accordance with a supply of oil pressure, and the controller is further programmed to accelerate the speed ratio variation of the subtransmission mechanism by increasing an oil pressure supplied to the subtransmission mechanism.

7. The control device as defined in claim 4, further comprising a sensor that detects an actual output rotation speed of the subtransmission mechanism, wherein the controller is further programmed to calculate a current interim target rotation speed from a target output rotation speed to be achieved in the second gear position and a current target achievement level relative to the target output rotation speed, and boost an oil pressure supplied to the subtransmission mechanism by feedback-controlling the oil pressure supplied to the subtransmission mechanism based on a difference between the interim target rotation speed and the actual output rotation speed.

8. The control device as defined in claim 2, wherein the controller is further programmed to reduce the first determination value as the shifting process progresses.

9. The control device as defined in claim 1, wherein the vehicle is configured such that a rotation output of the internal combustion engine is input into the continuously variable transmission mechanism, an output of the continuously variable transmission mechanism is input into the subtransmission mechanism, and an output of the subtransmission mechanism is input into a drive wheel provided on the vehicle.

10. The control device as defined in claim 1, wherein the continuously variable transmission mechanism comprises a belt continuously variable transmission mechanism that transmits rotation via a belt wrapped around a pair of pulleys and varies the speed ratio continuously by varying a groove width of the pulleys in accordance with supply of an oil pressure, and the controller is further programmed to reduce the shift speed of the continuously variable transmission mechanism via control of the oil pressure supplied to the pulleys.

11. A control device for a continuously variable transmission that is connected to an internal combustion engine installed in a vehicle, the continuously variable transmission comprising a continuously variable transmission mechanism that modifies a speed ratio continuously and a subtransmission mechanism that is conneced in series with the continuously variable transmission mechanism and includes, as vehicle forward advancing gear positions, a first gear position and a second gear position having a smaller speed ratio than the first gear position, the control device comprising:

means for detecting an engine rotation speed of the internal combustion engine;

means for performing a cooperative speed change in which the speed ratio of the continuously variable transmission mechanism is controlled in an opposite direction to a speed ratio variation of the subtransmission mechanism;

means for determining if a rapid increase in the engine rotation speed has occurred during the cooperative speed change; and means for reducing a shift speed of the continuously variable transmission mechanism during shifting when the rapid increase has occurred with respect to an occasion when the rapid increase has not occurred, during the cooperative speed change when a shifting process for shifting the subtransmission mechanism from the first gear position to the second gear position is conducted.

12. A control method for a continuously variable transmission that is connected to an internal combustion engine installed in a vehicle, the continuously variable transmission comprising a continuously variable transmission mechanism that modifies a speed ratio continuously and a subtransmission mechanism that is connected in series with the continuously variable transmission mechanism and includes, as vehicle forward advancing gear positions, a first gear position and a second gear position having a smaller speed ratio than the first gear position, the control method comprising:

detecting an engine rotation speed of the internal combustion engine;

performing a cooperative speed change in which the speed ratio of the continuously variable transmission mechanism is controlled in an opposite direction to a speed ratio variation of the subtransmission mechanism;

determining if a rapid increase in the engine rotation speed has occurred during the cooperative speed change; and reducing a shift speed of the continuously variable transmission mechanism when the rapid increase has occurred with respect to an occasion when the rapid increase has not occurred, during the cooperative speed change when a shifting process for shifting the subtransmission mechanism from the first gear position to the second gear position is conducted.

* * * * *